Figure 1:
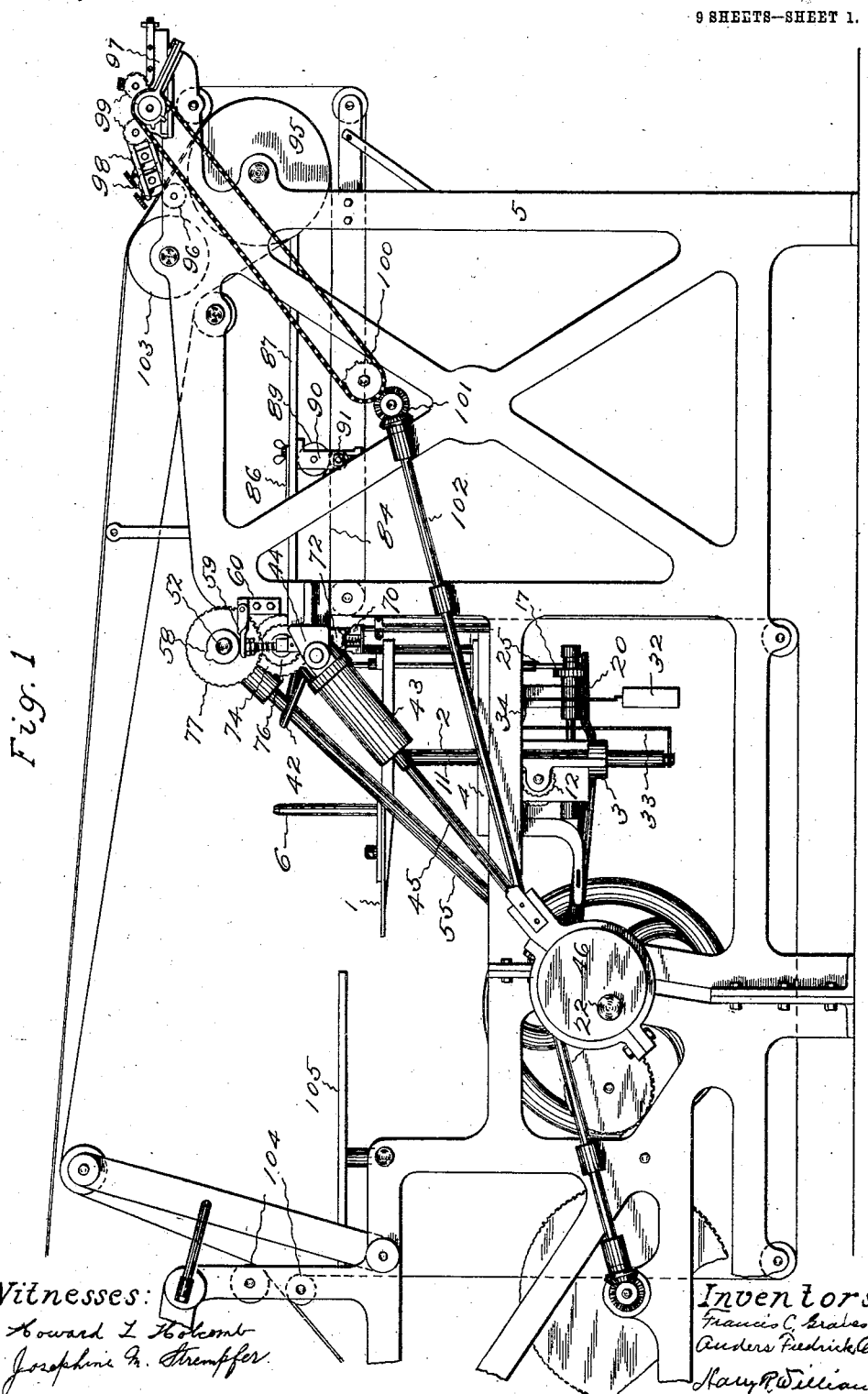

F. C. GRAVES & A. F. OLIN.
MACHINE FOR SEPARATING AND FEEDING PAPER BLANKS.
APPLICATION FILED FEB. 3, 1910.

965,889.

Patented Aug. 2, 1910.

9 SHEETS—SHEET 1.

Witnesses:
Howard L. Holcomb
Josephine M. Strempfer

Inventors:
Francis C. Graves &
Anders Fredrick Olin
Harry R. Williams
atty.

THE NORRIS PETERS CO., WASHINGTON, D. C.

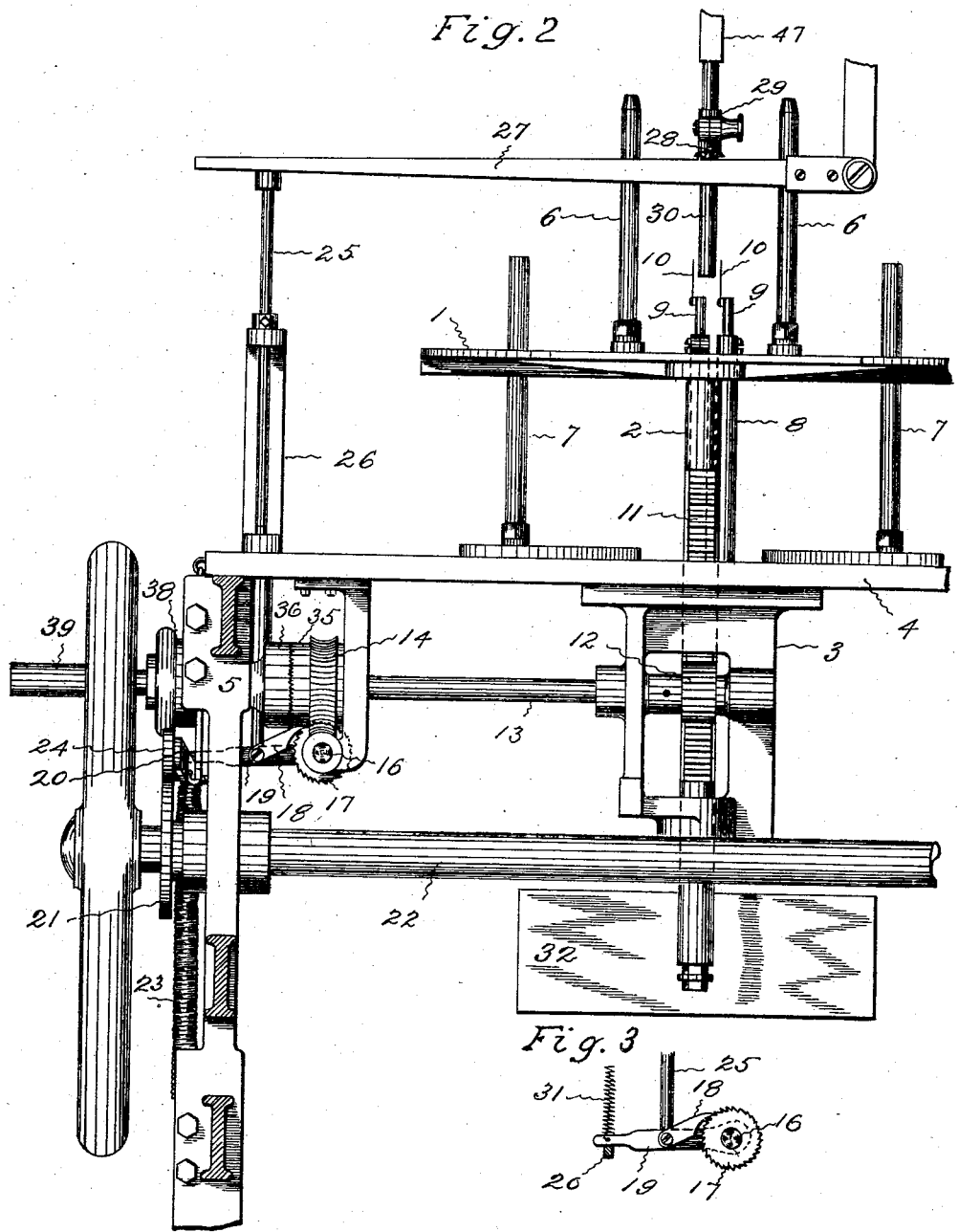

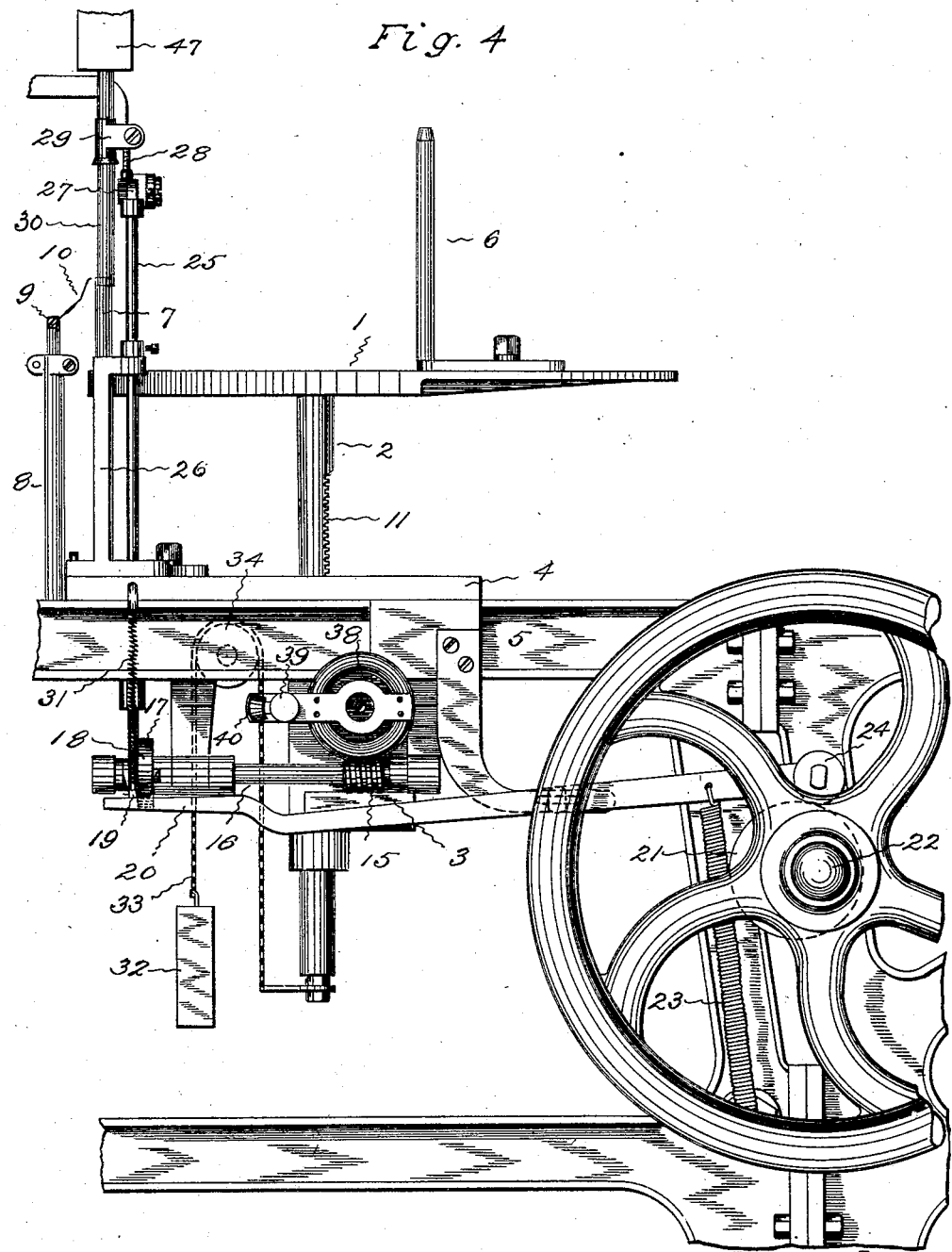

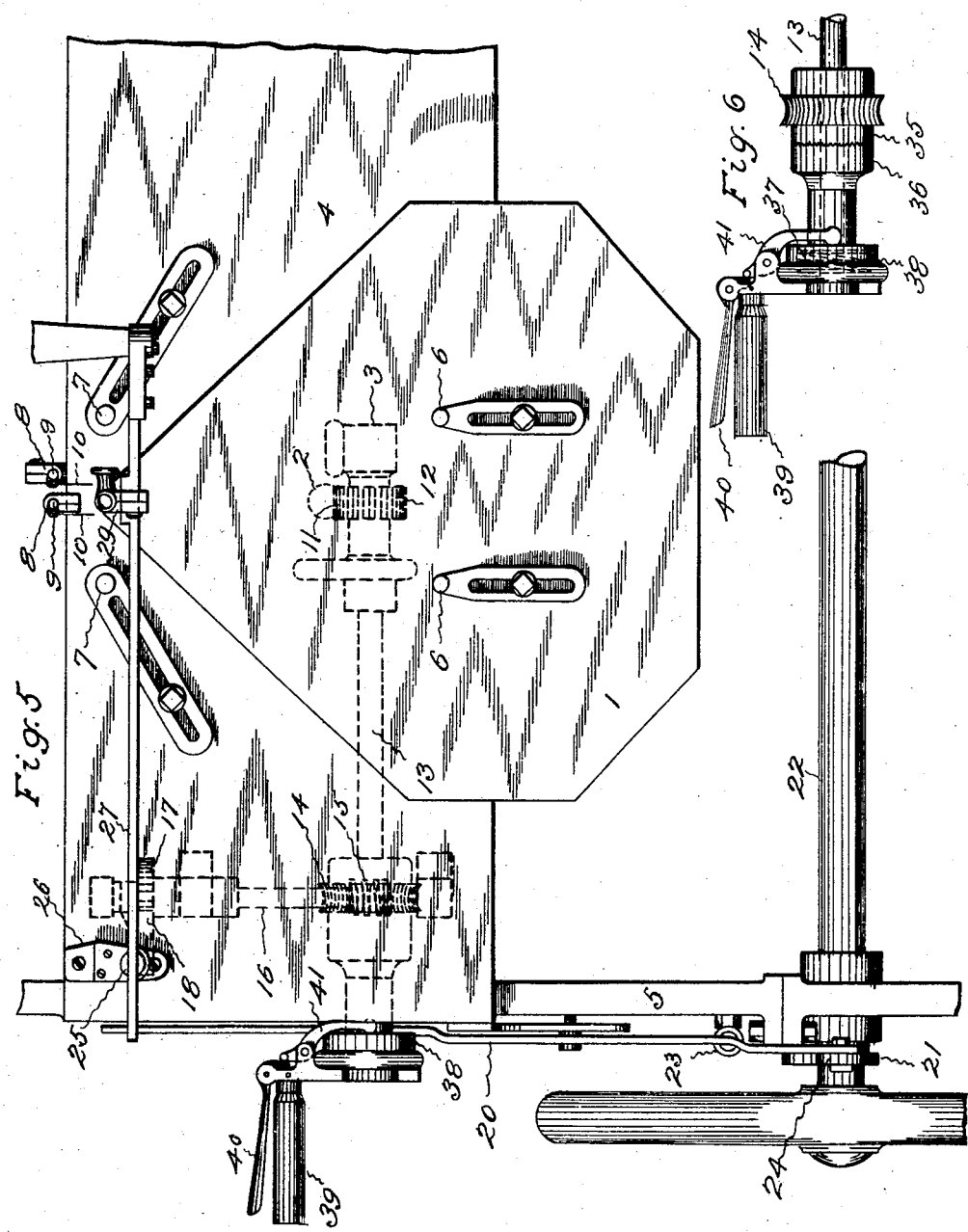

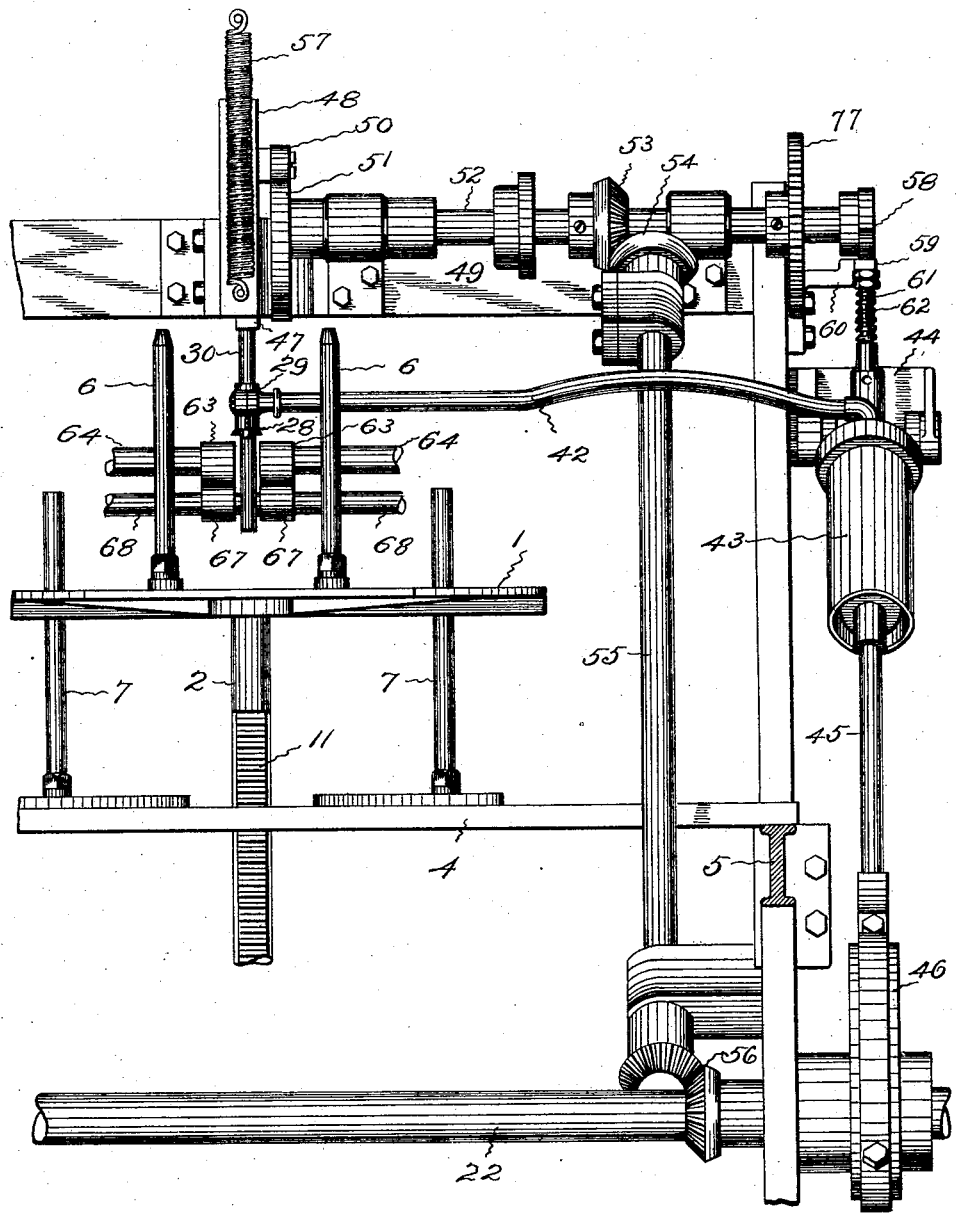

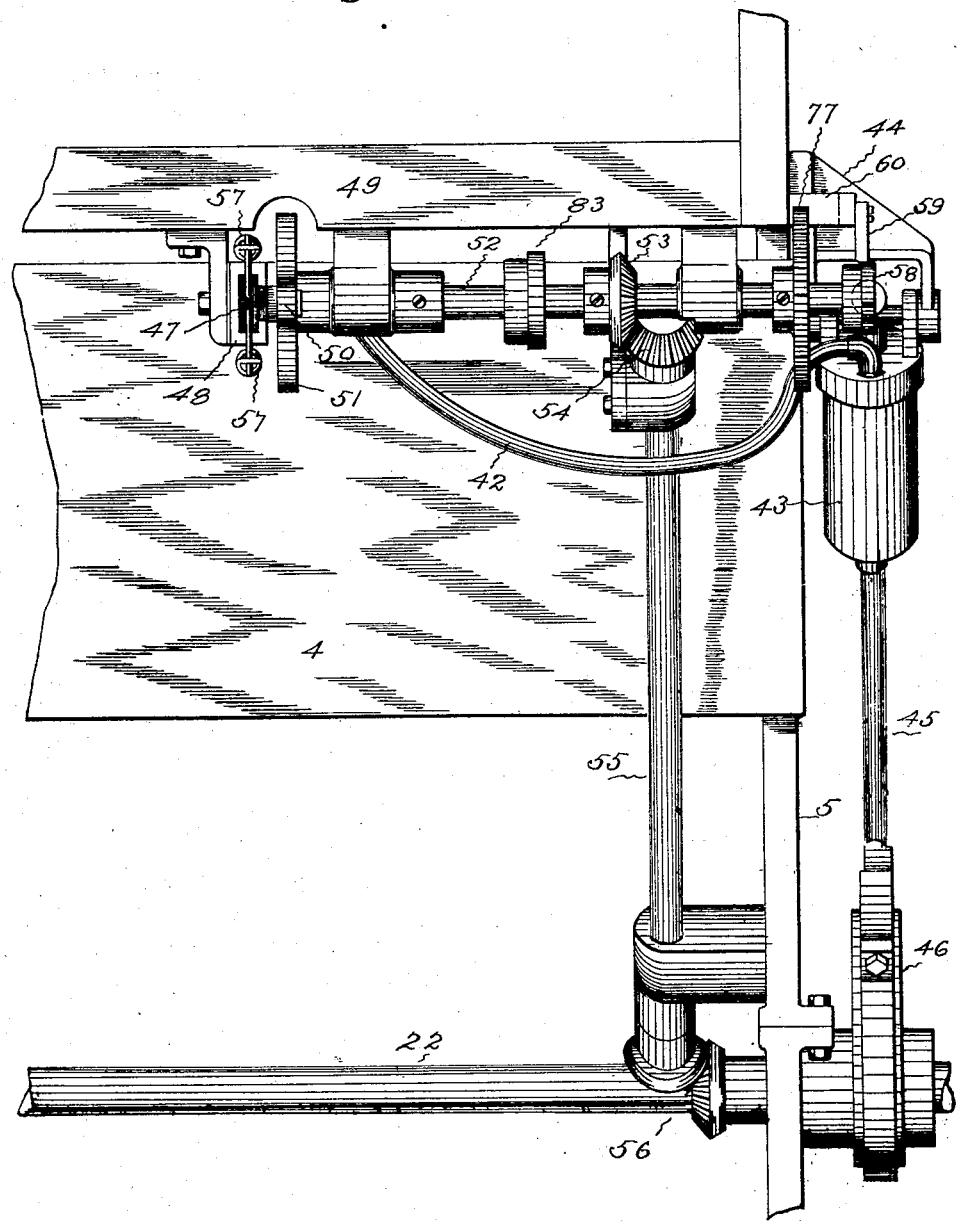

F. C. GRAVES & A. F. OLIN.
MACHINE FOR SEPARATING AND FEEDING PAPER BLANKS.
APPLICATION FILED FEB. 3, 1910.
965,889.
Patented Aug. 2, 1910.
9 SHEETS—SHEET 7.
Fig. 10
Fig. 9
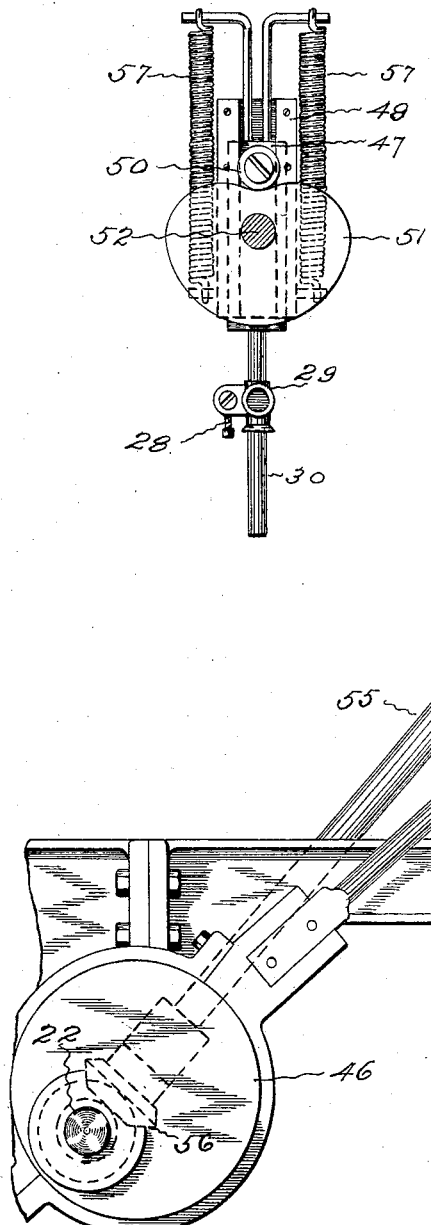
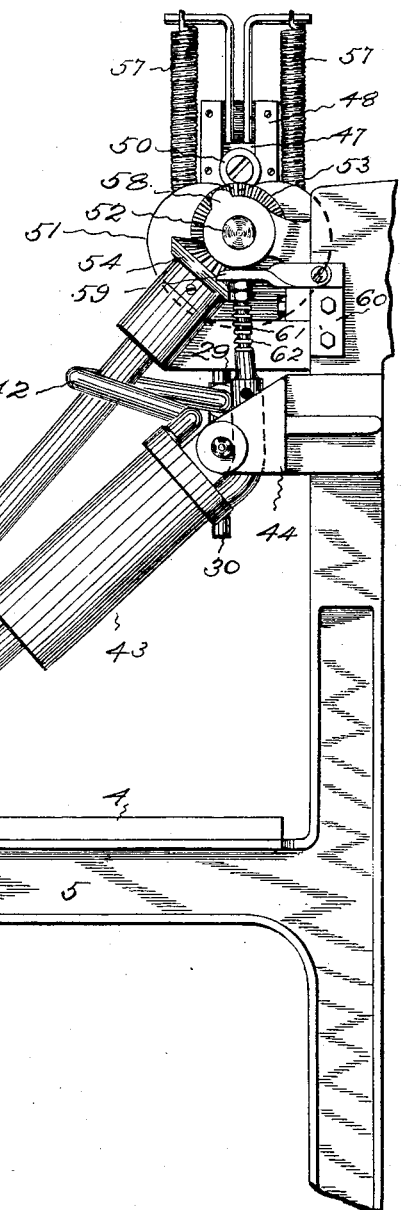
Witnesses:
Inventors:

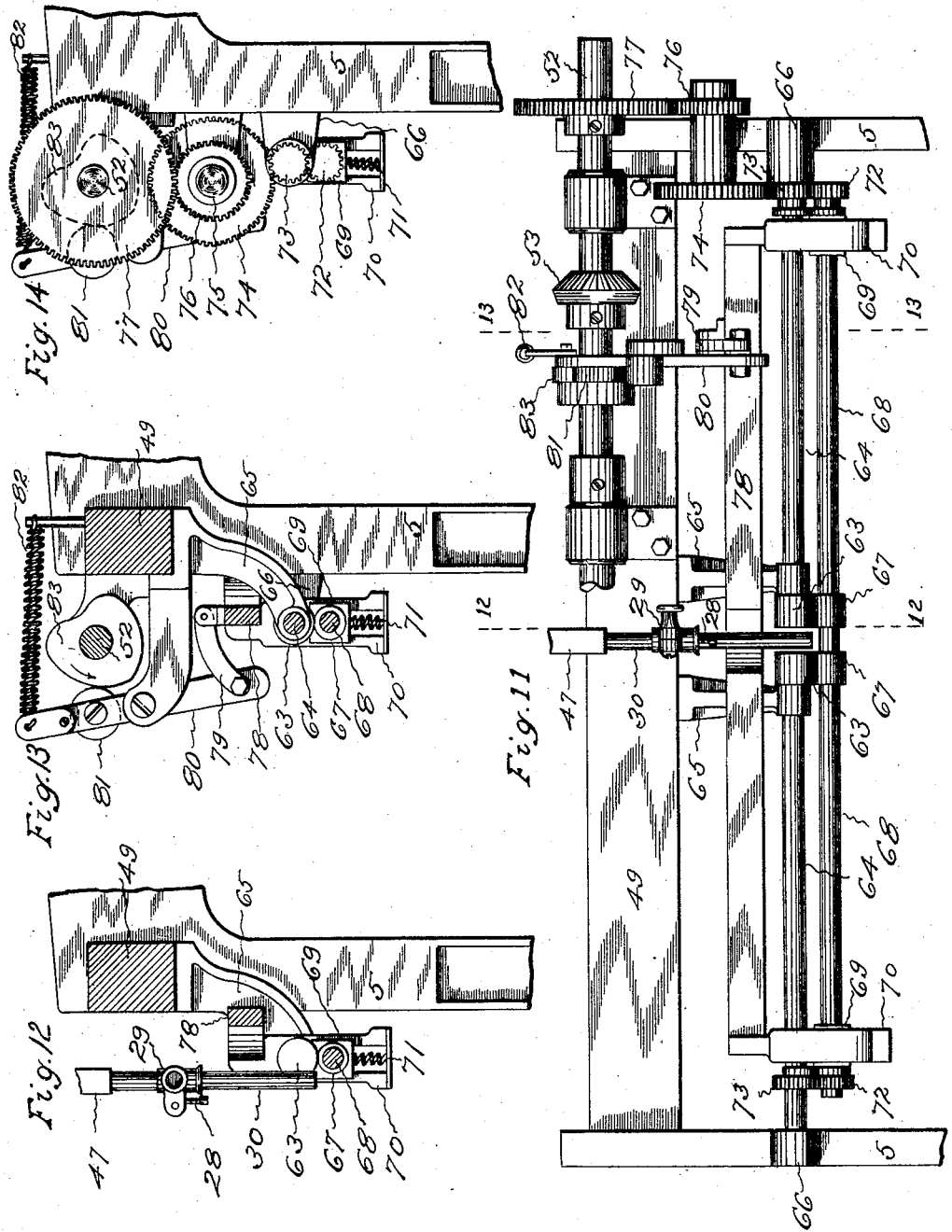

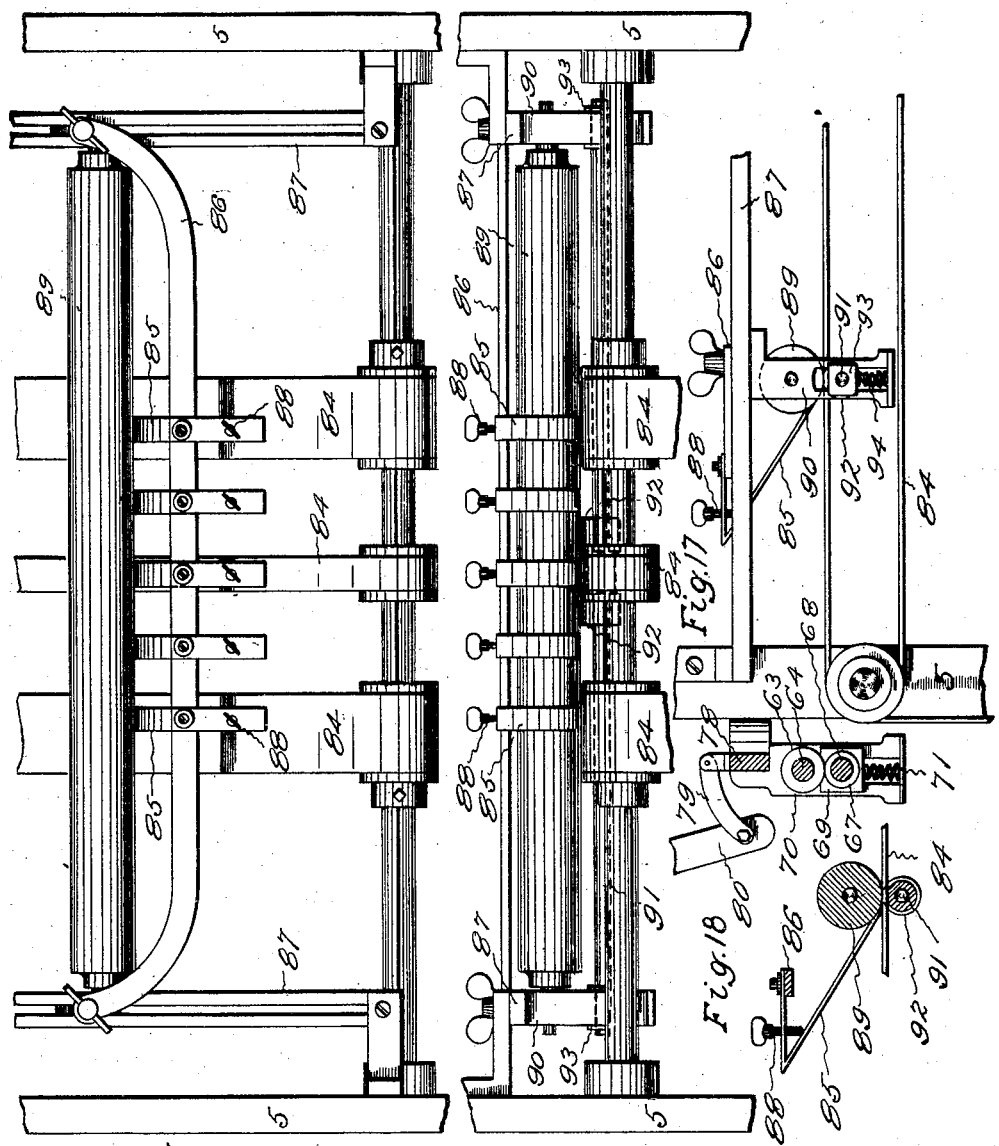

UNITED STATES PATENT OFFICE.

FRANCIS C. GRAVES, OF HARTFORD, AND ANDERS FREDRICK OLIN, OF WINDSOR, CONNECTICUT, ASSIGNORS TO UNITED STATES ENVELOPE COMPANY, OF SPRINGFIELD, MASSACHUSETTS, A CORPORATION OF MAINE.

MACHINE FOR SEPARATING AND FEEDING PAPER BLANKS.

965,889.   Specification of Letters Patent.   Patented Aug. 2, 1910.

Application filed February 3, 1910. Serial No. 541,856.

*To all whom it may concern:*

Be it known that we, FRANCIS C. GRAVES and ANDERS FREDRICK OLIN, citizens of the United States, residing at Hartford and Windsor, respectively, in the county of Hartford and State of Connecticut, have invented a new and useful Improvement in Machines for Separating and Feeding Paper Blanks, of which the following is a specification.

This invention relates to a machine for applying mucilage, paste, or other adhesive substance to envelop blanks, or to sheets or strips of paper, or other material, which are designed for various uses.

The object of the invention is to provide a simple mechanism for such a machine, which will surely deliver and correctly feed into the machine with great rapidity, blanks of various shapes and sizes, particularly envelop blanks of odd shapes and sizes, and will carry the blanks to the gumming mechanism, so arranged and spaced that the necessary quantity of adhesive substance will be properly applied in the desired locality on each blank.

In the machine illustrated as embodying the invention, the blanks are piled upon an elevator, located near the center of the machine, and automatically raised the thickness of a blank each time a blank is taken from the pile. The front edge of the top blank is lifted by a suction picker and grasped by rotating and oscillating rolls which pull the top blank from the pile and throw it upon endless traveling bands. These bands take the blanks as they are thrown by the delivery rolls, between retarding rolls which arrange and space the blanks upon the bands in such manner that when they pass the gumming mechanism, the proper edges of the blanks will be correctly provided with the desired amount of adhesive. The bands, then, after carrying the gummed blanks past an apparatus which dries the gum, deliver the blanks in a pile upon a table, located near the center of the machine, adjacent to the elevator, in such manner that a single operator may pile the blanks upon the elevator from which they are fed into the machine, and remove the gummed and dried blanks from the table onto which they are discharged, without moving from one position.

Figure 1 of the accompanying drawings shows a side elevation of so much of such a blank gumming machine, as is necessary to illustrate the invention. The drying mechanism is omitted, and the gumming mechanism is not delineated in detail in the drawings, as these mechanisms form no part of the invention which is the subject of the present claims. Fig. 2 shows a rear elevation of the elevator and the mechanism for raising and lowering it. Fig. 3 shows a detail of the elevator operating mechanism. Fig. 4 shows a side elevation of the elevator and its operating mechanism. Fig. 5 shows a plan of the elevator and its operating mechanism. Fig. 6 shows a detail of the elevator mechanism. Fig. 7 shows a rear elevation of the pick up tube, the mechanism for reciprocating it vertically, and the mechanism for producing a suction therein. Fig. 8 shows a plan of the pick up operating and suction mechanism. Fig. 9 shows a side elevation of the pick up operating and suction mechanism. Fig. 10 shows a side view of the pick up tube and its support. Fig. 11 shows a rear elevation of the rotating and oscillating feed rolls. Fig. 12 shows a section on the plane indicated by the dotted line 12—12 on Fig. 11. Fig. 13 shows a section on the plane indicated by the dotted line 13—13 on Fig. 11. Fig. 14 shows a side elevation of the driving mechanism for the feed rolls shown in Fig. 11. Fig. 15 shows a plan of a portion of the endless feed bands, the blank guiding fingers, and the retarding and spacing rolls. Fig. 16 shows a rear elevation of the same. Fig. 17 shows a side elevation of the same. Fig. 18 shows a section of the retarding and spacing rolls and guiding fingers.

The blanks to be gummed are placed in a pile upon the elevator 1. This elevator is mounted on the upper end of a vertical column 2 that is movably held in bearings formed in a bracket 3 which is attached to the underside of a shelf 4 that extends below the elevator, transversely across the frame 5. (Figs. 2, 4.) Two vertically arranged gage posts 6 are adjustably fastened to the top of the elevator, and two vertically arranged gage posts 7 are adjustably fastened to the shelf, for retaining the blanks on the elevator in correct position to be picked up and fed into the machine. (Figs. 2, 5.) Two posts 8, which also extend upwardly from the shelf, adjustably hold rods 9 that are provided with spring fingers 10 arranged to engage the front edges of the blanks so as to hold them down and prevent more than one at a time being picked up and fed. (Figs. 4, 5.)

On one side of the column which supports the elevator is a rack 11, and meshing with this rack is a pinion 12, that is attached to a shaft 13 which extends transversely of the machine beneath the shelf. (Figs. 2, 5.) Loose on this shaft is a worm wheel 14, and meshing with this worm wheel is a worm 15 that is fixed on a short shaft 16 which extends parallel with and near to one of the side frames. (Figs. 2, 4.) Attached to this latter shaft is a ratchet wheel 17 with fine teeth arranged to engage with which is a pawl 18 pivotally mounted on an arm 19 that is fulcrumed on the shaft. This arm is engaged and lifted for causing the pawl to feed the ratchet, and through the worm and worm wheel, and pinion and rack, to lift the elevator with a step by step movement, by the end of a lever 20 that is pivoted to the side frame. This lever is oscillated by a cam 21 on the driving shaft 22 and a spring 23 which is connected between the frame and the lever in such manner as to hold the roll 24 on the end of the lever against the cam. (Figs. 2, 3, 4.)

The pawl arm is pushed down for retracting the pawl over the teeth of the ratchet wheel by a rod 25 movably held in a bracket 26 attached to the top of the shelf. This rod is depressed by a lever 27 that is arranged in the path of the head of a screw 28 which is turned into a fitting 29 on the pick-up tube 30. (Figs. 2, 4.) A spring 31 is connected with the end of the pawl arm to prevent the arm from dropping too far, and also to aid in supporting the weight of the vertical rod and the lever which depresses it. The weight of the elevator and the blanks mounted thereon, is counterbalanced by a weight 32 that is connected by a chain 33, which passes over a pulley 34, with the lower end of the elevator supporting column. (Fig. 4.) As the blanks vary in thickness, and the amount of each upward movement must be equal to the thickness of the blank removed, the rate of feed of the elevator must be variable. To accomplish this the pawl arm is lifted for feeding the ratchet wheel positively by the cam and lever, every time to a certain position, and is depressed, for retracting the pawl, by the rod and lever, that are actuated by the pick-up tube, a variable distance, depending on the adjustment of the screw 28, so that each time a blank is picked up and passed into the machine, the elevator is fed up the required distance to keep the top blank always at the same level. The number of ratchet teeth over which the pawl is retracted determines the amount of upward feed of the elevator.

For the purpose of rapidly lowering the elevator to position to receive a stack of blanks, and for quickly raising the elevator to bring the top blank to the proper level, the worm wheel, as above stated, is loosely mounted on the shaft that bears the pinion which meshes with the rack on the elevator column. On one side of the worm wheel is a clutch member 35. This clutch member is engaged by a clutch member 36 that is splined on the shaft and is forced toward the other clutch member by a spring 37 arranged in the spring case 38 which is fastened to the shaft and provided with a handle 39. (Figs. 2, 5, 6.) An auxiliary handle 40 is pivoted to the spring case adjacent to the main handle. When the two handles are pressed together, the inner end of the auxiliary handle engages a lever 41 that has a forked end arranged in contact with the movable clutch member so as to draw the movable member against the pressure of the spring and separate the clutch members. When these members are disengaged, the shaft is free and can be rotated by the handle for quickly raising or lowering the elevator.

The fitting 29 on the vertically reciprocating tube 30, the lower end of which is desirably made of rubber, is connected by a flexible pipe 42 with a pump 43. One end of the pump case is hinged to a bracket 44 attached to one of the side frames, and the pump plunger is connected by a rod 45 with an eccentric 46 on the driving shaft. (Figs. 7, 8, 9.) This pump at the proper time causes a suction which lifts the front edge of the top blank up against the lower end of the tube. The pick-up tube is attached to a slide 47 that is held in a guide bracket 48 which is fastened to a cross bar 49 of the frame. (Figs. 9, 10.) This slide is lifted by the engagement with a small roller 50, mounted on a stud projecting from the slide, of a cam 51 on a transverse shaft 52 that has a beveled gear 53 in mesh with a beveled gear 54 on a shaft 55 that is driven from the driving shaft by a pair of beveled gears 56. (Figs. 7, 8, 9.) The pick-up slide is drawn down, and its roll held against the cam by a pair of springs 57. (Fig. 10.) This mechanism lowers the bottom end of the pick-up tube against the top blank and causes such suction that when the tube is raised the front edge of the top blank is lifted from the pile beneath. On the outer end of the transverse shaft that operates the pick-up is a cam 58 that engages an arm 59 which is pivoted to the bracket 60 attached to the side frame. (Figs. 7, 9.) This arm bears against the outer end of the stem 61 of a vacuum breaking valve which controls an opening into the end of the pump. (Fig. 9.) A spring 62 on this valve stem normally keeps the valve closed, and the cam, through the arm, opens the valve and relieves the suction when the picker tube is raised.

As the lifted blank is released, by the breaking of the suction, its edge is grasped and pulled forward by rolls, all of which are rotated, and the lower of which are oscillated. The upper rolls 63 are fixed on the inner ends of a divided shaft 64, the sections of which are mounted in bearings 65 attached to the cross bar 49 and bearings 66 attached to the sides of the frame. (Fig. 11.) This shaft is divided at the middle to permit the pick-up tube to pass down and up between the upper rolls for the purpose of picking up and lifting a blank. The lower rolls 67 are fastened on a shaft 68 that is held by bearing blocks 69 movably mounted in grooves in arms 70 which are pivoted on the upper roll shaft. (Figs. 11, 12.) Springs 71 are arranged below the bearing blocks to thrust the lower roll shaft up toward the upper roll shaft. (Fig. 12.) On the ends of the lower roll shaft are pinions 72 which mesh with pinions 73 on the upper roll shaft for the purpose of causing these shafts and rolls to rotate together. (Fig. 11.) Meshing with one of the pinions on the upper roll shaft is a gear 74 on an arbor 75 that bears a pinion 76 which meshes with a gear 77 on the pick-up operating shaft. (Figs. 11, 14.) The upper ends of the arms, which carry the bearing blocks for the lower roll shaft, are joined by a bar 78 that extends transversely of the machine and parallel with the roll shafts. (Fig. 11.) This bar is connected by a link 79 with the end of a lever 80 that bears a roll 81 which is held by a spring 82 in contact with a cam 83 on the transverse picker operating shaft. (Figs. 11, 13.) This cam and lever oscillate the bearing block arms and swing the lower shaft back and forth so that the lower rolls, while rotating, will be carried beneath the picked up blank for the purpose of engaging its underside and drawing it forward between the rolls. The oscillating and rotating rolls throw the blanks forward, one at a time, upon the parallel traveling endless feed bands 84, of which there may be any desired number, preferably three. (Figs. 15, 16.) The blanks are guided onto the feed bands, as they are thrown forward by the feed rolls, by spring fingers 85 that are attached to a yoke 86 which extends across the machine. This yoke is supported at its ends by slotted bars 87 that are secured to the side frames. The positions of the ends of the spring fingers are determined by thumb screws 88. (Figs. 15, 16, 17, 18.)

The blanks, as they pass beneath the spring fingers, are spaced upon the feed bands by a roll 89 that is supported above the bands by brackets 90 adjustably secured to the slotted bars 87. Below this spacing roll is a shaft 91 with rolls 92 that hold up the bands and coöperate with the roll 89 to space the blanks on the bands. (Fig. 16.) The lower roll shaft is mounted in bearing blocks 93 which are vertically movable in slots in the brackets that carry the upper roll shaft. (Fig. 17.) Spring 94 below the bearing blocks, carrying the lower roll shaft, holds the rolls up with the necessary pressure to effect the desired action. The brackets which bear these spacing rolls are adjusted along the slotted bars a greater or less distance from the rotating and oscillating rolls, which deliver the blanks onto the bands, according to the size of the blanks to be passed through the machine and gummed. These rolls are located so as to retard the blanks as they are thrown forward by the delivery rolls and pass them forward uniformly spaced on the bands.

The feed rolls are rotated quite rapidly. The lower roll is swung back under the edge of the blank lifted by the pick-up, and then as the edge of that blank is caught between the rolls, is quickly swung forward in such manner that, due to the oscillation of the lower roll, and the rapid rotation of both of the rolls, the blank is thrown forward onto the bands. If it were not for the roll 89 the blanks might fall anywhere on the bands. Some of the blanks might be thrown too far and some not far enough, depending upon the weight of the paper, the temperature and humidity of the atmosphere and the air currents. Thus they would not be uniformly spaced on the bands, and the amount of gum would vary on each blank. To obviate this, and to uniformly space the blanks, they are thrown forward by the rotating and swinging feed rolls and guided by the spring fingers against the under surface of the roll 89, which roll, acting in conjunction with the roll 92, as stated above, retards the blanks so that they will always land on the bands in the same relation to each other.

The amount of overlap of the blanks, that is, the amount of flap which is exposed for gumming, and which varies with the size of the blanks and according to desire, depends on the relation of the speed of travel of the feed or carrying bands to the speed of delivery of the blanks onto the bands by the feed rolls.

The feed bands carry the blanks properly overlapped by the spacing rolls, around a drum 95 which is located at the front of the machine and is rotated by the moving bands. After carrying them around this drum, the bands carry the blanks over an idler roll 96, at which point the adhesive compound is applied by the gumming mechanism. (Fig. 1.) The gumming mechanism which is shown has a receptacle 97 for the adhesive, and several rolls 98 for transferring the required quantity of adhesive from the receptacle to the desired portions of the blanks which are brought up from beneath by the traveling bands. The gumming rolls are rotated by intermeshing gears 99, that are driven by a sprocket chain gearing 100 which is driven by beveled gears 101 rotated by a shaft 102 connected with the driving mechanism. (Fig. 1.) The details of the gumming mechanism, are not fully illustrated and completely described, as these details form no part of the invention claimed here.

After passing the gumming rolls and receiving a quantity of adhesive, the bands carry the blanks over an idler drum 103 and then to the gum drying mechanism, (not shown). After the blanks pass the drier, they are delivered by the bands between the rolls 104 onto the table 105 near the center of the machine, adjacent to and just back of the elevator. (Fig. 1.)

The invention claimed is:

1. In a gumming machine, the combination of an elevator, mechanism for moving the elevator vertically, a pick-up tube movable vertically toward and from the elevator, means for producing a suction in said tube, feed rolls, gearing for rotating both of the feed rolls, and mechanism for swinging the lower feed roll about the axis of the upper feed roll while it is being rotated, whereby the feed rolls will grasp and feed forward blanks as they are picked up by said suction tube.

2. In a gumming machine, the combination of an elevator, mechanism for moving the elevator vertically, a pick-up tube movable vertically toward and from the elevator, means for producing suction in said tube, feed rolls, gearing for rotating both of the feed rolls, mechanism for swinging the lower feed roll about the axis of the upper feed roll while it is being rotated, whereby the feed rolls will grasp and feed forward blanks as they are picked up by said suction tube, and endless bands for receiving the blanks fed by said rolls.

3. In a gumming machine, the combination of an elevator support, an elevator movably held by said support, mechanism for moving the elevator vertically, a pick-up tube movable vertically toward and from the elevator, means for producing a suction in said tube, feed rolls, gearing for rotating both of the feed rolls, mechanism for swinging the lower feed roll about the axis of the upper feed roll while it is being rotated, whereby the feed rolls will grasp and feed forward blanks as they are picked up by said suction tube, gage posts adjustably attached to the top of the elevator, and gage posts adjustably fastened to the elevator support.

4. In a gumming machine, the combination of an elevator, mechanism for moving the elevator vertically, a pick-up tube movable toward and from the elevator, means for producing a suction in said tube, rolls for grasping and feeding forward blanks picked up by said suction tube, means for rotating said rolls, endless bands for receiving the blanks fed by said rolls, and rolls for spacing the blanks on said endless bands.

5. In a gumming machine, the combination of an elevator, mechanism for moving the elevator vertically, a pick-up tube movable toward and from the elevator, means for producing a suction in said tube, rolls for grasping and feeding forward blanks picked up by said suction tube, means for rotating said rolls, endless bands for receiving the blanks fed by said rolls, fingers for guiding the blanks fed by the rolls onto the said bands, and rolls for spacing the blanks on said bands.

6. The combination in a gumming machine, of a pick-up tube, means for producing a suction of air at the end of said tube, a pair of rolls arranged one above the other adjacent to said pick-up tube, means for rapidly rotating both of said rolls, swinging means for supporting the lower roll from the axis of the upper roll and means for oscillating said supporting means so that said lower roll oscillates from the axis of the upper roll as both rolls are rotated.

7. The combination in a gumming machine, of a pick-up tube, means for producing a suction at the end of the tube, rotating rolls, the lower of which oscillate about the axis of the upper rolls, endless traveling bands passing adjacent to said rolls, and a pair of spacing rolls adjustable toward and from the feed rolls to stop and locate the blanks at the proper place on the endless bands.

8. In a gumming machine, the combination of an elevator, mechanism for automatically feeding the elevator slowly upward, means for quickly moving the elevator downward, a pick-up tube movable toward and from the elevator, means for producing a suction in said tube, rolls for grasping and feeding forward blanks picked up by said suction tube, means for rotating said rolls, and means for oscillating one of said rolls.

9. In a gumming machine, the combination of an elevator, mechanism for moving the elevator vertically, a pick-up movable toward and from the elevator, rotating and oscillating rolls for grasping and feeding forward blanks picked up by said tube, endless bands for receiving the blanks fed by said rolls, and rolls for spacing the blanks on said bands.

10. The combination in a gumming machine, of a pick-up tube, means for producing a suction at the end of the tube, rotating feed rolls, endless traveling bands passing adjacent to said rolls, and a pair of spacing rolls adjustable toward and from the feed rolls to stop and locate the blanks at the proper place on the endless bands.

11. The combination in a gumming machine, of a pick-up tube, a spring for moving the tube downward, a cam for moving the tube upward, a pump for producing a suction of air at the end of said tube, a pair of rolls arranged one above the other adjacent to said pick-up tube, means for rotating both of said rolls, swinging means supporting the lower roll from the axis of the upper roll and means for oscillating said supporting means so that said lower roll oscillates from the axis of the upper roll as both rolls are rotated.

FRANCIS C. GRAVES.
ANDERS FREDRICK OLIN.

Witnesses:
JOSEPHINE M. STREMPFER,
H. R. WILLIAMS.